US009374605B2

(12) United States Patent
Barton

(10) Patent No.: US 9,374,605 B2
(45) Date of Patent: Jun. 21, 2016

(54) METHOD FOR ENHANCING TELEVISION ADVERTISING VIEWERSHIP

(75) Inventor: James M. Barton, Alviso, CA (US)

(73) Assignee: TiVo Inc., Alviso, CA (US)

( * ) Notice: Subject to any disclaimer, the term of this patent is extended or adjusted under 35 U.S.C. 154(b) by 1695 days.

(21) Appl. No.: 11/982,256

(22) Filed: Oct. 31, 2007

(65) Prior Publication Data
US 2008/0109298 A1 May 8, 2008

Related U.S. Application Data

(60) Provisional application No. 60/855,890, filed on Oct. 31, 2006.

(51) Int. Cl.
H04N 21/24 (2011.01)
G06Q 30/02 (2012.01)
(Continued)

(52) U.S. Cl.
CPC .......... *H04N 21/2407* (2013.01); *G06Q 30/02* (2013.01); *G06Q 30/0201* (2013.01); *G06Q 30/0203* (2013.01); *G06Q 30/0264* (2013.01); *H04H 20/28* (2013.01); *H04H 20/38* (2013.01); *H04H 60/27* (2013.01); *H04H 60/31* (2013.01); *H04H 60/33* (2013.01); *H04H 60/46* (2013.01); *H04H 60/66* (2013.01); *H04H 60/73* (2013.01); *H04N 5/781* (2013.01); *H04N 7/17318* (2013.01); *H04N 21/2547* (2013.01); *H04N 21/25891* (2013.01); *H04N 21/2668* (2013.01);
(Continued)

(58) Field of Classification Search
CPC ................ H04N 21/2668; G06Q 30/0267
USPC ........ 705/1, 10, 14, 14.64; 725/32, 42, 90, 34
See application file for complete search history.

(56) References Cited

U.S. PATENT DOCUMENTS 5,973,685 A   10/1999   Schaffa et al.
6,181,746 B1  1/2001   Hoshi
(Continued)

FOREIGN PATENT DOCUMENTS

CN   1852410 A   10/2006
EP   1199890 A2   4/2002
(Continued)

OTHER PUBLICATIONS

Definition of "queue" from Microsoft Press® Computer Dictionary (Third Edition), Aug. 1997.*
(Continued)

*Primary Examiner* — Susanna M Meinecke Diaz
(74) *Attorney, Agent, or Firm* — Wong & Rees LLP

(57) ABSTRACT

A method and apparatus for enhancing television advertising viewership. Advertisers deliver content demographic and associated data as metadata along with content to a service that is in communication with a large number of multimedia devices. Each device supplies information to the service that tells about the user of the device's content viewing preferences. The service compares user information to content metadata to find content for the user. The service sends the selected content to the multimedia device. Advertisers whose content were downloaded to the multimedia device may be charged a fee for the download. The multimedia device sends statistics regarding the user's action when the user viewed the content to the service. The service charges a fee to advertisers that had their content viewed by the user.

12 Claims, 8 Drawing Sheets

(51) Int. Cl.

| | | |
|---|---|---|
| *H04H 20/28* | (2008.01) | |
| *H04H 20/38* | (2008.01) | |
| *H04H 60/27* | (2008.01) | |
| *H04H 60/31* | (2008.01) | |
| *H04H 60/33* | (2008.01) | |
| *H04H 60/46* | (2008.01) | |
| *H04H 60/66* | (2008.01) | |
| *H04H 60/73* | (2008.01) | |
| *H04N 5/781* | (2006.01) | |
| *H04N 7/173* | (2011.01) | |
| *H04N 21/2547* | (2011.01) | |
| *H04N 21/258* | (2011.01) | |
| *H04N 21/2668* | (2011.01) | |
| *H04N 21/433* | (2011.01) | |
| *H04N 21/442* | (2011.01) | |
| *H04N 21/475* | (2011.01) | |
| *H04N 21/81* | (2011.01) | |
| *H04N 21/84* | (2011.01) | |
| *H04N 5/765* | (2006.01) | |

(52) U.S. Cl.
CPC ....... *H04N 21/4331* (2013.01); *H04N 21/4333* (2013.01); *H04N 21/44222* (2013.01); *H04N 21/4755* (2013.01); *H04N 21/812* (2013.01); *H04N 21/84* (2013.01); *H04N 5/765* (2013.01)

(56) References Cited

U.S. PATENT DOCUMENTS

| | | | | |
|---|---|---|---|---|
| 2001/0049820 | A1* | 12/2001 | Barton | 725/32 |
| 2002/0120925 | A1 | 8/2002 | Logan | |
| 2002/0123928 | A1 | 9/2002 | Eldering et al. | |
| 2002/0129360 | A1 | 9/2002 | Lee | |
| 2002/0138831 | A1 | 9/2002 | Wachtfogel et al. | |
| 2002/0144262 | A1 | 10/2002 | Plotnick et al. | |
| 2003/0088872 | A1 | 5/2003 | Maissel et al. | |
| 2003/0145323 | A1 | 7/2003 | Hendricks et al. | |
| 2003/0149975 | A1* | 8/2003 | Eldering et al. | 725/34 |
| 2004/0003397 | A1 | 1/2004 | Boston et al. | |
| 2004/0015608 | A1* | 1/2004 | Ellis et al. | 709/246 |
| 2004/0148454 | A1 | 7/2004 | Seo | |
| 2004/0179825 | A1 | 9/2004 | Im | |
| 2004/0268387 | A1* | 12/2004 | Wendling | 725/35 |
| 2004/0268413 | A1* | 12/2004 | Reid et al. | 725/131 |
| 2005/0010950 | A1* | 1/2005 | Carney et al. | 725/45 |
| 2005/0074063 | A1 | 4/2005 | Nair et al. | |
| 2005/0076359 | A1 | 4/2005 | Pierson et al. | |
| 2005/0086703 | A1 | 4/2005 | Gupta et al. | |
| 2005/0216932 | A1 | 9/2005 | Danker | |
| 2005/0273828 | A1 | 12/2005 | Barton | |
| 2005/0278747 | A1 | 12/2005 | Barton et al. | |
| 2005/0289588 | A1* | 12/2005 | Kinnear | 725/35 |
| 2005/0289636 | A1 | 12/2005 | Schiller | |
| 2006/0041902 | A1 | 2/2006 | Zigmond | |
| 2006/0088279 | A1 | 4/2006 | Tsunashima | |
| 2006/0100928 | A1* | 5/2006 | Walczak et al. | 705/14 |
| 2006/0161947 | A1 | 7/2006 | Laksono et al. | |
| 2006/0184579 | A1 | 8/2006 | Mills et al. | |
| 2006/0223593 | A1* | 10/2006 | Ishak | 455/574 |
| 2007/0100690 | A1* | 5/2007 | Hopkins | 705/14 |
| 2007/0157249 | A1 | 7/2007 | Cordray et al. | |
| 2008/0060002 | A1* | 3/2008 | Noll et al. | 725/35 |
| 2008/0127249 | A1* | 5/2008 | Cruice | 725/34 |
| 2013/0227621 | A1 | 8/2013 | Barton | |

FOREIGN PATENT DOCUMENTS

| | | |
|---|---|---|
| JP | 2001-285777 | 10/2001 |
| JP | 2004-304405 | 10/2004 |
| WO | WO 01/91474 A2 | 11/2001 |
| WO | WO 02/41199 A2 | 5/2002 |
| WO | WO 02/43385 A2 | 5/2002 |
| WO | WO 02/082374 A2 | 10/2002 |
| WO | WO 03/010965 A1 | 2/2003 |
| WO | WO 03/075569 A2 | 9/2003 |
| WO | WO 2005/034503 A2 | 4/2005 |
| WO | WO 2005/107253 | 11/2005 |
| WO | WO 2006/091313 | 8/2006 |

OTHER PUBLICATIONS

Definition of "queue" from Dictionary.com, retrieved from [URL: http://dictionary.reference.com/browse/queue] on Apr. 5, 2011.*
International Search Report, application No. PCT/US07/23049 dated Mar. 14, 2008—(2 pgs).
Written Opinion of ISR, application No. PCT/US07/23049 dated Mar. 14, 2008—(5 pgs).
Claims, PCT/US07/83201, 6 pages.
International Searching Authority, "Notification of Transmittal of the International Search Report and the Written Opinion of the International Searching Authority, or the Declaration," PCT/US07/83201, received May 22, 2008, 9 pages.
Examiner's First Report for Australian patent application No. 2007313659, dated Apr. 13, 2010, 3 pages.
Current claims for Australian patent application No. 2007313659, 6 pages.
Examiner's First Report for Australian patent application No. 2007314276, dated Apr. 20, 2010, 2 pages.
Current claims for Australian patent application No. 2007314276, 5 pages.
Examiner's First Report for Australian patent application No. 2007313700, dated May 6, 2010, 2 pages.
Current claims for Australian patent application No. 2007313700, 6 pages.
International Search Report and Written Opinion for PCT application No. PCT/US07/23049 dated Mar. 14, 2008, 6 pages.
Examiner's First Report for Australian patent application No. 2007314276 dated Apr. 20, 2010, 2 pages.
AU Application No. 2007314276, references filed under Section 27(1) of the Patent Act of 1990, dated Aug. 20, 2010, 7 pgs.
AU Application No. 2007314276, current claims, 5 pgs.
Singapore Application No. 189554, Search Report dated Jul. 15, 2010, received in this office Oct. 28, 2010, 20 pgs.
Singapore Application No. 189554, Written Opinion, dated Jul. 15, 2010, received in this office, 10 pgs.
Singapore Application No. 189554, Current claims, 9 pgs.
Canadian Intellectual Property Office, "Office Action", Application No. 2,662,665, dated May 31, 2011, 2 pages.
Current Claims, Application No. 2,662,665, Applicant: Tivo Inc., dated May 2011, 12 pages.
Intellectual Property Office of Singapore, "Office Action" in Application No. 200902701-2, dated Jul. 7, 2011, 6 pages.
Current Claims for Application No. 200902701-2, dated Jul. 2011, 5 pages.
Australian Patent Office, "International Search Report", application No. 2007314276, applicant: Tivo Inc., dated Mar. 28, 2011, 3 pages.
Claims, application No. 2007314276, applicant: Tivo Inc., 5 pages.
European Patent Office Supplementary European Search Report mailed Sep. 26, 2011 for European Patent Application No. 07839886.4-1238, 7 pages, The Hague, Netherlands.
Current Claims as of Sep. 26, 2011 of European Patent Application No. 07839886.4-1238, 4 pages.
Hungarian Patent Office, International Search Report and Written Opinion, Singapore Patent Application No. 2009027020, dated Jul. 15, 2010, 23 pages.
Singapore Patent Application No. 2009027020, Claims as of Jul. 15, 2010, 6 pages.
Canadian Intellectual Property Office, Application No. 2,665,731, Office Action dated Nov. 26, 2010, 2 pages.
Canadian Application No. 2,665,731, Claims as of Nov. 26, 2010, 5 pages.
Canadian Intellectual Property Office, Application No. 2,665,731, Office Action dated Nov. 7, 2011, 2 pages.
Canadian Application No. 2,665,731, Claims as of Nov. 7, 2011, 8 pages.

(56) References Cited

OTHER PUBLICATIONS

Canadian Intellectual Property Office, Application No. 2,662,825, Office Action dated Dec. 14, 2010, 2 pages.
Canadian Application No. 2,662,825, Claims as of Dec. 14, 2010, 6 pages.
The State Intellectual Property Office of the People's Republic of China, "Notification of the Second Office Action", Chinese Patent Application No. 200780040918.7 dated Apr. 20, 2011, 11 pages. (English translation included).
Chinese Patent Application No. 200780040918.7, Claims as of Apr. 20, 2011, 3 pages.
The State Intellectual Property Office of the People's Republic of China, "Notification of the First Office Action", Chinese Patent Application No. 200780040918.7 dated Sep. 9, 2010, 21 pages. (English translation included).
Chinese Patent Application No. 200780040918.7, Claims as of Sep. 9, 2010, 5 pages.
European Patent Office, Extended European Search Report received in EP application No. 07844743.0, dated Oct. 4, 2011, 7 pages.
European application No. 07844743.0, Claims as of Oct. 4, 2011, 4 pages.
"Notification of Reasons for Rejection" received in Japanese Patent Application No. 2009-534947, dated Dec. 6, 2011, 4 pages. (English translation included).
Japanese Patent Application No. 2009-534947, Claims as of Dec. 6, 2011, 6 pages.
"Notification of Reason for Rejection" received in Japanese Patent Application No. 2009-534943, dated Jan. 4, 2012, 10 pages. (English translation included).
Japanese Patent Application No. 2009-534943, Claims as of Jan. 4, 2012, 8 pages.
The State Intellectual Property Office of the People's Republic of China, "Notification of the Fourth Office Action" mail date Jun. 5, 2012, Chinese Patent Application No. 200780038448.0, 9 pages.
Claims as of Jun. 5, 2012 in Chinese Patent Application No. 200780038448.0, 5 pages.
Canadian Intellectual Property Office, Office Action mailed Jun. 8, 2012 in Canadian Patent Application No. 2,662,825, 2 pages.
Claims as of Jun. 8, 2012 in Canadian Patent Application No. 2,662,825, 6 pages.
Australian Patent Office, "Patent Examination Report No. 1", mail date Jun. 26, 2012 in Australian Patent Application No. 2011200369, 3 pages.
Claims as of Jun. 26, 2012 in Australian Patent Application No. 2011200369, 3 pages.
Decision of Rejection from the Japan Patent Office, received in Japanese patent application No. 2009-534947, mail date Aug. 7, 2012, 3 pages(English Translation).
Claims as of Aug. 7, 2012 in Japanese patent application No. 2009-534947, 6 pages.
European Patent Office, "Office Action", 07 839 866.4-1238, dated Jul. 13, 2012, applicant Tivo Inc. 7 pages.
Claims as of Jul. 13, 2012 in application No. 07 839 866.4-1238, dated 2012, 4 pages.
European Patent Office, "Search Report" in applicatio No. 07 863 7212.2-1905, dated Apr. 2, 2014, 7 pages.
Current Claims in European application No. 07 863 7212.2-1905, dated Apr. 2014, 3 pages.
Canadian Intellectual Property Office, "Office Action", in application No. 2,662,665, dated May 6, 2013, 3 pages.
Current Claims in application No. 2,662,665 dated May 2013, 7 pages.
Australian Government, "Patent Examination Report" in application No. 2011235993, dated Jun. 28, 2013 3 pages.
Claims in application No. 2011235993 dated Jun. 3013, 4 pages.
Intellectual Property Office of Singapore, "Search and Examination Report" received in Singapore Patent Application No. 200902702-0, dated Aug. 10, 2012, 9 pages.
Current Claims in application No. 200902702-0, dated Aug. 2012, 6 pages.
The State Intellectual Property Office of the People's Republic of China, "First Office Action" in application No. 20111022927.9, dated Jul. 3, 2013, 7 pages.
Current Claims in application No. 20111022927.9, dated Jul. 2013, 3 pages.
Australian Intellectual Property, "Patent Examination Report No. 1", in application No. 2012200077, dated Sep. 3, 2013, 3 pages.
Current Claims in application No. 2012200077, dated Sep. 2013, 7 pages.
The State Intellectual Property Office of the People's Republic of China, "Notification of Second Office Action" in application No. 201110229927.9, dated May 28, 2014, 7 pages.
Claims in China application No. 201110229927.9, dated May 2014, 3 pages.

\* cited by examiner

METHOD FOR ENHANCING TELEVISION ADVERTISING VIEWERSHIP

CROSS-REFERENCE TO RELATED APPLICATIONS; PRIORITY CLAIM

This application claims benefit of U.S. Provisional Appln. 60/855,890, filed Oct. 31, 2006, the entire contents of which is hereby incorporated by reference as if fully set forth herein, under 35 U.S.C. §119(e).

FIELD OF THE INVENTION

The present invention generally relates to the distribution of multimedia advertisements to consumer devices.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The typical business model of television advertisers is to pay networks and broadcasters fees for placing commercials in specific commercial timeslots available during airings of certain televisions shows. The advertisers select television shows that they believe their target audience will view. For example, if the advertiser is an auto manufacturer that wants to advertise its latest pickup truck, the advertiser may pay a large fee to a network to have its commercial aired during the first quarter of an NFL football game because the advertiser believes that the viewers of the football game are in its target audience.

A local car dealer may pay a fee to the local broadcaster of the same NFL football game to have his commercial aired during a time slot in the football game that is set aside for local broadcasters.

Both the network and local broadcasters base their fees on their prediction of how popular the television show will be. The more popular the show, the higher the fee. Additionally, certain segments of a show may carry a higher fee just because of the content in the particular segment. For example, the last segment of a Survivor show may have a higher advertisement fee because the network believes that more viewers will tune into that segment of the show to see which participant gets voted off the island.

The advent of digital video recorders (DVRs) has caused advertisers to question the value of paying the fees charged by the broadcasters. DVRs allow viewers to maneuver anywhere within a recorded portion of a television show. Using that capability, a viewer can easily skip over commercial breaks in television shows. All a viewer has to do is delay watching a live television show for 15 minutes and the DVR will have enough of the television show recorded to enable the viewer to start watching the beginning of the television show and have enough of the television show recorded ahead of his viewing position to skip all of the commercial breaks within a one-hour television show.

This places the networks and local broadcasters in a position where their timeslots for advertisements are not as valuable as before. The advertisers now have to decide if it is worth the expense to place advertisements in a media where the viewers are prone to skipping their advertisements.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
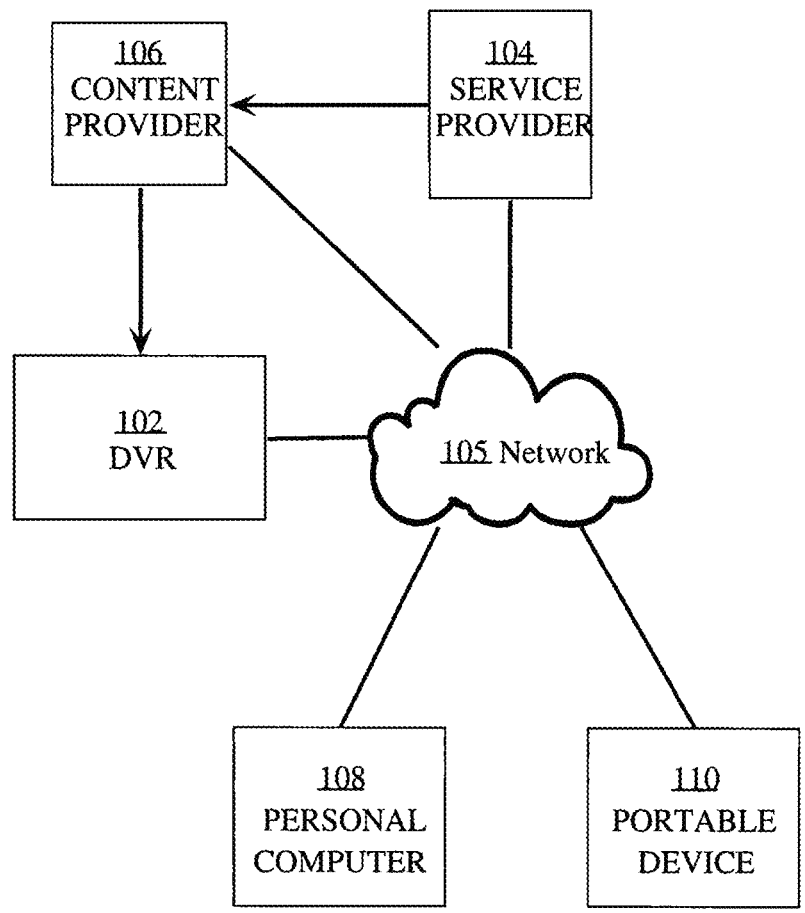
FIG. 1A is a block diagram that illustrates a service provider communicating across a network with a plurality of devices, according to an embodiment of the invention.

A method for enhancing television advertising viewership is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Description
   2.1 Distributing Advertisements and Content to Multimedia Devices
3.0 Implementation Mechanisms—Hardware Overview
4.0 Extensions and Alternatives 1.0 General Overview In the following description, the term "content" encompasses multimedia content such as: advertisements, images, text, graphics, video commercials, audio commercials, URLs, audio content, video content, and any form of advertisement that can be stored at and viewed via a multimedia device such as a set-top box, PC, or portable device. The embodiments described herein can apply to all types of content.

An embodiment of the invention provides advertisers and content providers with a definitive viewer accounting system that directly tracks viewership of content at the viewing source rather than relying on a network's or broadcaster's viewership guess as in the traditional approach.

An advertiser or content provider specifies metadata that is associated with their content. The metadata indicates certain information that the advertiser or content provider associates with the content. An embodiment allows users to specify content viewing preferences that relate to what types of advertisements or other multimedia content that they are willing to accept and possibly view. The system distributes the advertiser's or content provider's content to multimedia devices that have users that have expressed content viewing preferences that match the metadata. The system can distribute content and metadata to multimedia devices such as set-top devices (e.g., digital video recorders (DVRs), televisions, multimedia PCs, and cable and satellite tuners), portable audio and video devices (e.g., MP3 players, video players, multimedia players, etc.), and satellite and terrestrial radios with local storage devices, for example.

The system distributes a user's requested content and associated metadata to his multimedia device and the multimedia device can track whether he views any of the content. The multimedia device displays content to the user based on information in the metadata that informs the multimedia device about when and how the multimedia device should display the content to the user. The multimedia device has the ability to track the user's actions while content is being viewed by the user. The multimedia device records what function commands (e.g., fast forward, slow, pause, rewind, etc.) the user used to operate the multimedia device during the playback of content. The multimedia device sends the user's actions along with the associated content identification back to a server or distribution service.

The service provider can charge service fees to the advertiser or content provider when content is downloaded to a multimedia device and can charge service fees to the advertiser or content provider when a user views content on a multimedia device.

The service can generate a report based on recorded user input commands and associated content identification received from a plurality of multimedia devices for any of: indicating popularity of content for a specific advertiser or content provider, indicating what actions users performed during display of certain content for a specific advertiser or content provider, or indicating most popular content of all advertisers or content providers that have content available from a service.

In other aspects, the invention encompasses a computer apparatus and a computer-readable medium configured to carry out the foregoing steps.

2.0 Structural and Functional Description

FIG. 1A illustrates an example system according to an embodiment. The system contains DVR 102 which is communicatively coupled to network 105 through any communication interface, such as an Ethernet interface or wireless communications port. The functionality of a DVR is typified in U.S. Pat. No. 6,233,389 which is owned by the Applicants and is hereby incorporated by reference. The system also includes service provider 104, content provider 106, personal computer 108 and portable device 110.

Personal computer 108 may be a personal computing device, such as a desktop computer or laptop computer, and is also coupled to network 105 through any communications interface, including wireless. Portable device 110 may be any handheld computing device, cellular phone, portable media player, or any other portable device capable of displaying multimedia content and is also coupled to network 105 through any communications interface, including wireless. DVR 102, personal computer 108, and portable device 110 each communicate with service provider 104 through network 105. In another embodiment, DVR 102, personal computer 108, and portable device 110 each communicate with content provider 110 through network 105.

Network 105 may be implemented by any medium or mechanism that provides for the exchange of data between devices in the communication system. Examples of network 105 include, without limitation, a network such as a Local Area Network (LAN), Wide Area Network (WAN), the Internet, one or more terrestrial, satellite or wireless links, etc. Alternatively or additionally, any number of devices connected to network 105 may also be directly connected to each other through a communications link.

In one embodiment, content provider 106 provides broadcast program content to DVR 102 via cable, satellite, terrestrial communication, or other transmission method. Broadcast program content may include any multimedia content such as: audio, image, or video content. In another embodiment, content provider 106 provides multimedia content, such as any downloadable content, through network 105 to DVR 102, personal computer 108, or portable device 110.

In one embodiment, DVR 102 communicates with service provider 104, which provides program guide data, graphical resources (such as fonts, pictures, etc.), service information, software, advertisements, event identification data, and other forms of data that enable DVR 102 to operate independently of service provider 104 to satisfy user interests. In another embodiment, DVR 102, personal computer 108, and portable device 110 can communicate with each other to transfer content, metadata, or any other data through network 105 or any local network.

In another embodiment, content provider 106 may provide, to service provider 104, content data or any metadata, including promotional data, icons, web data, and other information. Service provider 104 may then interpret the metadata and provide the content data and metadata to DVR 102, personal computer 108, or portable device 110.

Figure 1B:
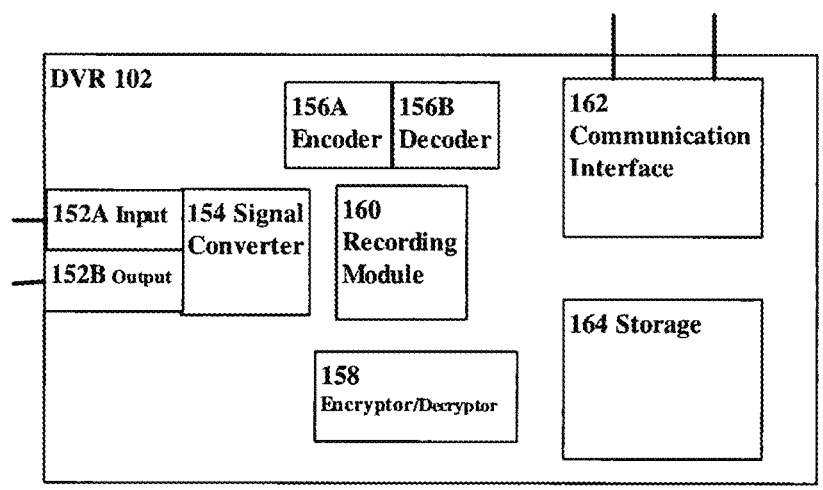
FIG. 1B is a block diagram illustrating a general overview of the components of a Digital Video Recorder (DVR), according to an embodiment of the invention.

Referring to FIG. 1B, in an embodiment, DVR 102 generally comprises a plurality of components, signified by signal converter 154, that are necessary to digitize an analog television signal and convert it into a digital data stream or accept a digital data stream. DVR 102 receives broadcast signals from an antenna, from a cable TV system, satellite receiver, etc., via input 152A. Input 152A may comprise a plurality of tuning modules that allow a plurality of signals to be received and recorded simultaneously.

Recording module 160 records the incoming data stream by storing the digital data stream on at least one storage facility, signified by storage 164 that is designed to retain segments of the digital data stream. A signal converter 154 retrieves segments of the data stream, convert the data stream into an analog signal, and then modulate the signal onto a RF carrier, via output 152B, through which the signal is delivered to a standard TV set, via an antenna input, cable input, etc. Signal converter 154 can also convert the data stream into an analog signal for output via output 152B to composite input, S-video input, etc., to a TV set or monitor. Output 152B may alternatively deliver a digital signal to a TV set or video monitor. For example, DVR 102 may utilize a Digital Visual Interface port (DVI) for sending digital signals to a TV via a DVI cable or DVR 102 may utilize a High-Definition Multimedia Interface port (HDMI) for sending digital signals to a TV via a HDMI cable. A portable DVR or media player can utilize an internal display screen and optionally deliver a digital or analog signal to a TV set or video monitor via output 152B.

DVR 102 also includes a communication interface 162, through which the DVR 102 communicates with network 105 via Ethernet, wireless network, modem, or other communications standard. Further, DVR 102 may be integrated into a TV system such that the components described above are housed in a TV set capable of performing the functions of each component of DVR 102.

In another embodiment, DVR 102 generally comprises a plurality of components necessary to receive, record, store, transfer and playback digital data signals from a plurality of sources, such as a PC, a DVR, a service provider, or content server. DVR 102 can transfer digital data signals to another DVR or PC. DVR 102 may encode or decode digital signals via encoder 156A and decoder 156B into a plurality of formats for playback, storage or transfer. DVR 102 can also encrypt or decrypt digital data signals using encryptor/decryptor 158 for storage, transfer or playback of the digital data signals.

In one embodiment, DVR 102 communicates with service provider 103, which provides program guide data, graphical resources such as brand icons and pictures, service information, software programs, advertisements, and other forms of data that enable DVR 102 to operate independently of the service provider 104 to perform autonomous recording functions. Communication between DVR 102 and service provider 104 utilizes a secure distribution architecture to transfer data between the DVR 102 and the service provider 104 such that both the service data and the user's privacy are protected.

2.1 Distributing Advertisements and Content to Multimedia Devices

An embodiment of the invention manages and distributes content to multimedia devices such as set-top boxes, PCs, or portable devices.

Television advertisers are subject to the network (cable operators, satellite providers, multiple system operators (MSO), etc.) and local (local cable operators, terrestrial broadcasters, etc.) broadcasters' fee structures for placement of commercial advertisements. The fees are broken down into national and local fee structures where national fees are naturally higher because of the larger viewing audience. The fee structure is based on the popularity of a television program and what demographics the broadcaster estimates the viewing audience to be for the program. A very popular program will have commercial slots during that program priced at a premium. Also, programs that appeal to viewers that are more consumer-oriented have higher fees for their commercial slots.

Advertisers must pay the network and local broadcasters' fees even though the network or broadcasters' viewership estimates are incorrect. For example, a program that the network believes will be popular among viewers that are 20-30 years old, may be a flop, i.e., a relatively small number of viewers actually watched the entire program. The advertisers that paid for commercial slots during that program fail to achieve full value for their payments because their advertisements were not seen by a large enough audience to warrant the fee paid for the timeslot.

The Nielsen ratings are also used by networks and broadcasters to determine the popularity of a program. However, Nielsen ratings for programs are inaccurate because the sample audience that Nielsen uses is very small compared to the actual viewing audience. Nielsen also uses viewer diaries where a viewer hand writes his reactions to a program after he watches the program. This approach is inconsistent and does not track individual viewer demographics and viewing habits, but rather a family of viewers in a household. As a result, many times the Nielsen ratings do not reflect the actual popularity of a program among a certain demographic. Advertisers end up paying fees for commercial timeslots that have ratings based on an inaccurate rating system. This results in over-valued commercial timeslots where the advertisers' advertisements do not reach their desired audience.

An embodiment changes the traditional television advertisement model. Rather than relying on the network and local broadcasters' estimates as to what viewer demographics that their programs will reach, the advertiser or content provider is given the power to specify exactly what viewer demographics should be with the advertiser's or content provider's content. For example, the system distributes an advertiser's content to multimedia devices that have users that match the advertiser's specified demographics. The system can distribute content to multimedia devices such as set-top devices (e.g., digital video recorders (DVRs), televisions, multimedia PCs, and cable and satellite tuners), portable audio and video devices (e.g., MP3 players, video players, multimedia players, etc.), and satellite and terrestrial radios with local storage devices, for example. An embodiment allows a multimedia device to track whether a user views any of the distributed content and reports the results to a server that can be operated by a service that distributes the content or even a data collection service. Note that the term "view" and its derivatives as used herein with respect to embodiments describes user actions that include any of the following: playing content, listening to content, viewing a textual or graphical content, etc.

Another embodiment allows users to specify what types of content that they are willing to accept and possibly view. The system distributes a user's requested content to his multimedia device and the multimedia device can track whether he views any of the content. The advertiser or content provider pays the distribution service a fee based on the number of times the advertiser's or content provider's content have been viewed. The multimedia device has the ability to track the user's actions while content is being viewed by the user. The multimedia device has the ability to record exactly what function commands (e.g., fast forward, slow, pause, rewind, etc.) the user used to operate the multimedia device during the playback of content. The multimedia device can send the user's actions along with the associated content identification back to a server or distribution service.

Figure 2:
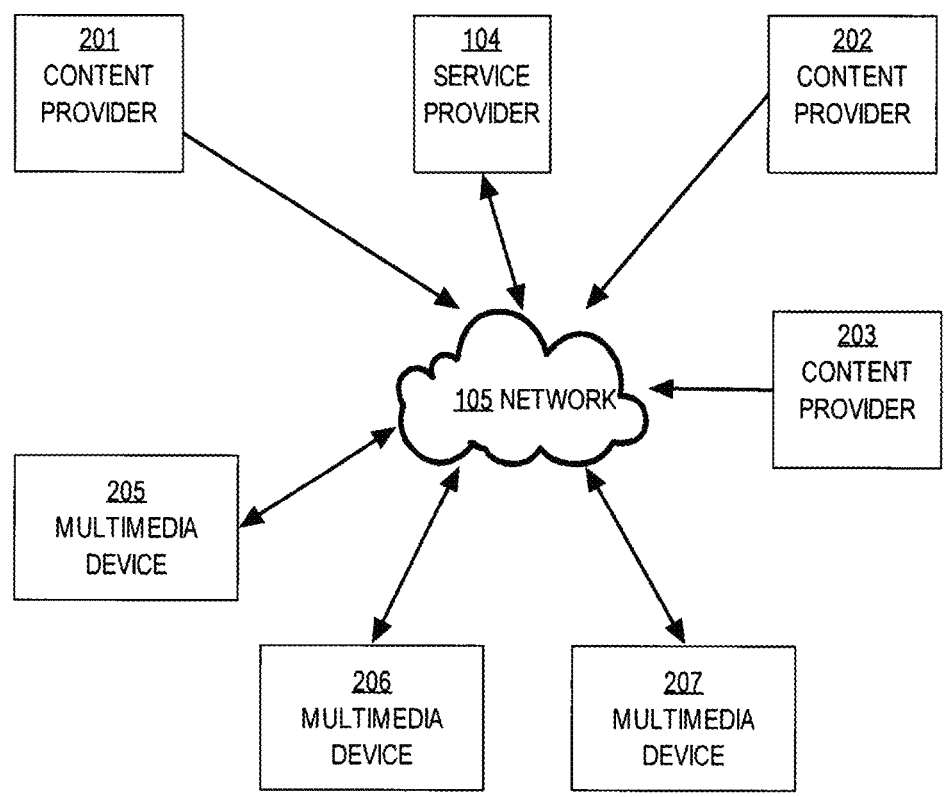
FIG. 2 is a block diagram that illustrates a plurality of ad/content providers and their communication connection to a service provider and multimedia devices according to an embodiment of the invention.

Referring to FIG. 2, an embodiment allows advertisers or content providers to specify certain viewer demographic data for content along with other information such as when the content should be shown or a specific program that the content should be shown with. Advertisers/content providers 201-203 deliver content demographic and associated data as metadata along with content to a service 104 via network 105 or any other suitable communications or media delivery method. The service 104 is in communication with a large number of multimedia devices 205-207. Each device has the ability to supply information to the service 104 that tells the service 104 about the user of the device such as the user's personal statistics, the user's viewing or programming history, and/or the user's express content preferences. For example, a set-top device may have a user that is male, 35 years old, and regularly watches or records football games, The Simpsons, South Park, and DIY shows. A portable media player may have a user that is female, 50 years old, and listens to NPR and classical radio stations, downloads CNN broadcasts to the portable media player, and subscribes to political podcasts.

The service 104 gathers user information from the multimedia devices 205-207. The user information is correlated by the service 104 so the service 104 can easily reference demographic or other user information that can be used to compare against content metadata. Multimedia devices are selected for distribution of content based on information such as: user demographics, geographical location of the multimedia device, user expressed product/brand preferences, user inferred product/brand preferences, user Internet searches, user searches performed on the multimedia device (e.g., title, genre, or actor searches), user audio and/or video programming preferences, user expressed content preferences, etc.

Once the service 104 selects content for a multimedia device, the service queues the content for the multimedia device to download. The multimedia device 205 can either pull content from the service 104 or have the content pushed to it by the service 104. The multimedia device 205 periodically contacts the service to request any downloads in its queue. An embodiment allows the service 104 to actively instruct the multimedia device 205 to request for any downloads via any instant messaging communications protocol such as XMPP. When the service 104 receives a request from the multimedia device 205, the service 104 checks if the multimedia device has a queue. If the service 104 finds that there are content in the multimedia device's queue, the service 104 sends the contents of the queue to the multimedia device 205.

The multimedia device 205 receives the queue contents and stores the contents on a storage device. In an embodiment, advertisers or content providers whose content were downloaded to the multimedia device 205 may be charged a fee for the bandwidth used to download the content or possibly a delivery fee by the service 104 or any combination thereof. In an embodiment, the multimedia device 205 can display the content that are advertisements in an advertisement showcase where the user can select particular advertisements to view. The advertisement showcase displays a list of available advertisements. The user can select an advertisement from the list to watch or hear. In another embodiment, the multimedia device 205 can display the advertisements during specific shows as specified by metadata included with the advertisements. In yet another embodiment, the multimedia device 205 can list content in a listing of recorded content and programs where the user can select and view content from the listing.

An embodiment allows the user to specify if he wants content that he has expressed an interest in to be played during certain programs or time frames. The multimedia device 205 displays the content during those programs or time frames. This allows the user to indicate when he is most likely to pay attention to content. Other household members may likely be viewing or listening to other programs, or viewing or listening to programs during time frames other than the ones indicated by the user.

In an embodiment, the multimedia device 205 may indicate to the user that a content item being played is one that the user has expressed interest in. The indication may be audible (e.g., a short sound) or visual (e.g., a textual notification or icon display overlaid onto the video signal). A visual indicator can be overlaid onto the video signal in a manner that allows the indicator to be seen even though the user is watching the program in a mode other than normal speed. The user may then pay closer attention to the content when an indication occurs. If the user is fast forwarding or reversing through the program, the indication may cause the user to terminate his fast forward or reverse progression through the program in order to watch the content.

The multimedia device 205 stores statistics regarding the content such as when the user viewed the content, if the user viewed the entire content or partially viewed the content, how many times the user viewed the content, what parts of the content were viewed repeatedly, etc. The multimedia device periodically contacts the service 104 and sends the content statistical information to the service. The service 104 evaluates the statistical information for viewed content and charges a viewing fee to advertisers or content providers that had their content viewed by the user.

Figure 3:
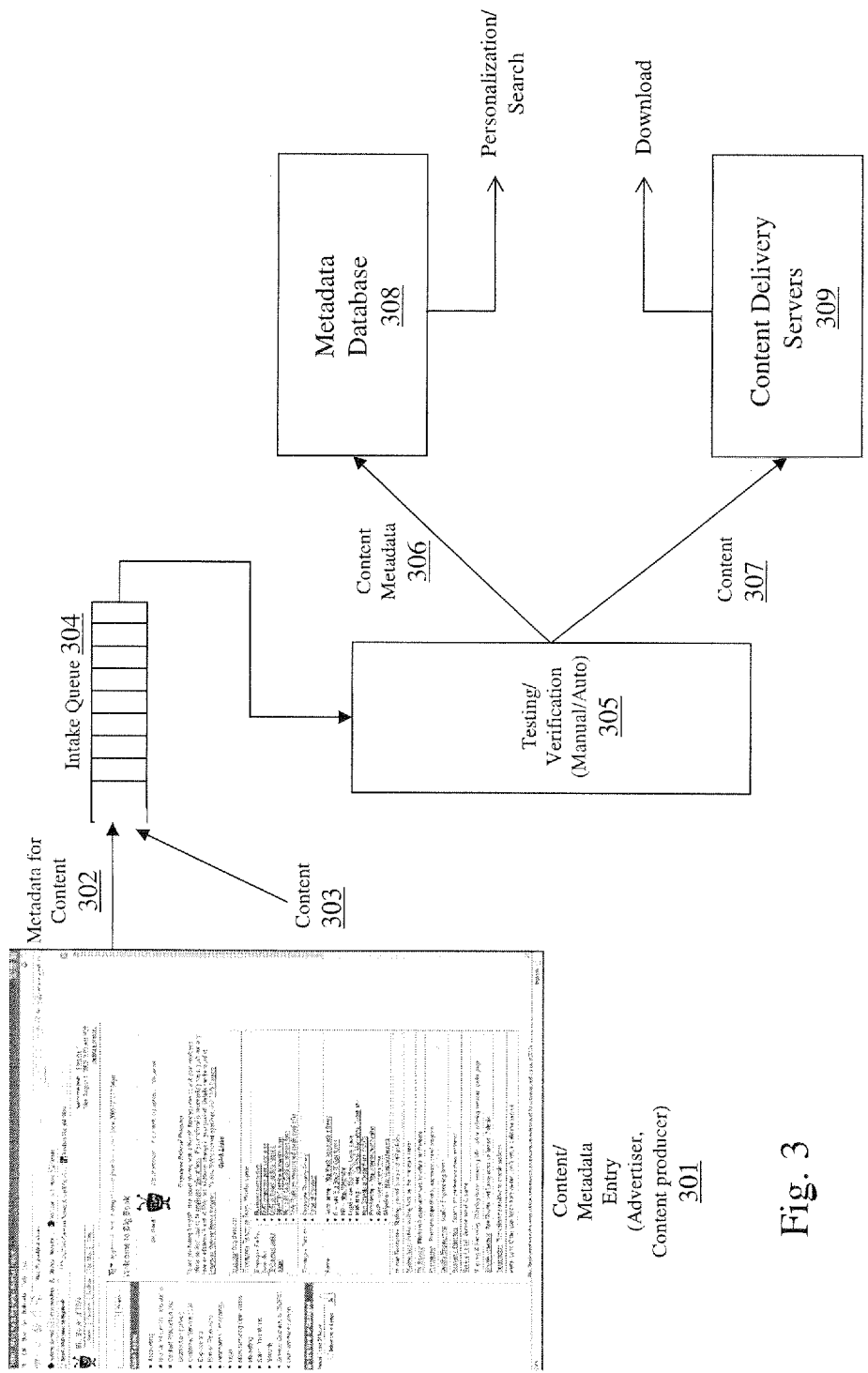
FIG. 3 is a block diagram that illustrates processing of advertisements/content and metadata submitted by an advertiser or content provider according to an embodiment of the invention.

Referring to FIG. 3, an advertiser or content producer uses a user interface supplied by the service to download content (audio, video, multimedia, etc.) 303 and metadata associated with the content 302 to the service's server. The metadata describes certain aspects of the content such as title, description, demographic information (e.g., males, age 25-40, females age 30-50, etc.), keywords, user interests (discussed below) that would correlate with the content subject matter, brand name, any industry standard ratings or indicators, etc. The user interface can be Web-based where the advertiser or content provider accesses the service's server via the Internet or other network. The user interface can alternatively be client-based where the advertiser or content provider loads (or creates) the content and metadata associated with the content to the client and the client uploads the content 303 and metadata associated with the content 302 to the service's server via the Internet or other network. The service's server queues up content in a queue 304. The queue 304 serves as temporary storage for the service to perform integrity checks on the content and metadata.

A verification and testing station 305 allows an operator to view and edit the content and metadata to ensure that the formatting and content are within the service's guidelines for data format and content subject matter. Alternatively, the verification and testing can be automatically performed using software that formats the metadata to the service's standards and scans the content for integrity.

Once the testing and verification stage for content and associated metadata is complete, the metadata 306 is sent to a metadata database 308. The metadata database is later used for content searches and user content personalization. The content 307 is sent to content delivery servers 309 that store content to be delivered to multimedia devices.

Figure 4:
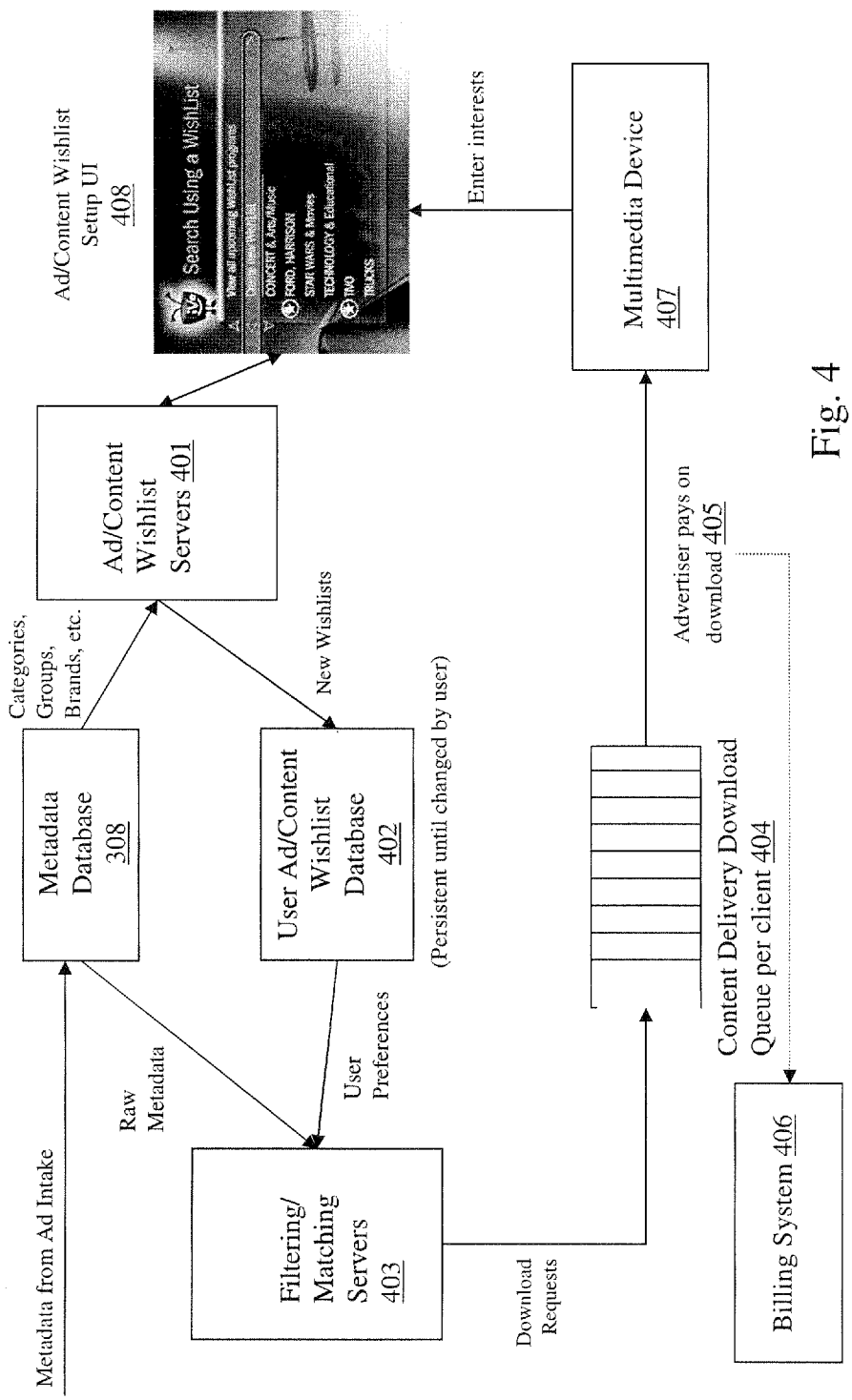
FIG. 4 is a block diagram that illustrates filtering and matching of advertisements/content with user preference information according to an embodiment of the invention.

Referring to FIG. 4, a user of the multimedia device 407 enters his preferences for the type of content that he would like to view or hear. The user indicates his preferences using a user interface 408 that allows him to enter the kinds of content that he is interested in viewing or listening to, such as: advertisement/content categories (e.g., automotive, electronics, fast food, beer, travel, entertainment, network upcoming shows, financial services, lifestyle, etc.), specific brands (e.g., Coke, Pepsi, Miller, NBC, CNN, Lexus, BMW, etc.), content media types (e.g., audio, video, text, etc.), locale (e.g., local, city, state, national), etc. Within a category can be subcategories. For example, the category automotive may have sub categories such as luxury, sedan, and sport. An alternative embodiment allows the user to enter his interests, e.g., recreational topics (e.g., extreme sports, football, golf, etc.), informational areas (e.g., CNN, MSNBC, Bloomberg, etc.), hobbies (e.g., DIY shows, cooking, etc.), genres (e.g., reality shows, cartoons, comedy, romance movies, action, etc.), etc.

The user interface may occur as a result of a promotion shown during content that the multimedia device plays, a user selected menu option, in response to a user's reaction to an icon displayed during a program, etc.

By entering preference information, the user has opted into a program that allows the multimedia device to report the user's preferences to the service 104. The service 104 is allowed to use the user's preferences to select content for the user's multimedia device. The user's preference information is tied to the multimedia device. The multimedia device 407 sends the user's preferences to the ad/content wishlist server(s) 401. An ad/content wishlist is a list of a user's content preferences that indicate what content the user is willing to view or hear. Each wishlist is associated with the multimedia device that reported the user's preferences. The ad/content wishlist server 401 receives data regarding the metadata keywords from the metadata database 308. The ad/content wishlist server 401 correlates the user's wishlist with the current categories, brands, groups, etc. that the metadata database 308 is using to ensure that the filtering/matching servers 403 will properly match wishlists with content.

Corrected wishlists are sent from the ad/content wishlist server 401 to the user ad/content wishlist database 402. The user ad/content wishlist database 402 contains the collection of the all of the wishlists of the users that have submitted their wishlists to the service. The wishlists from the user ad/content wishlist database 402 are used by the filtering/matching servers 403 to match raw metadata from the metadata database 308 in order to find content that matches user wishlists. Content are identified that the filtering/matching servers 403 believes that a user will want to view or hear. Given that the ad/content wishlist server 401 has ensured that wishlists are easily compared to content metadata, the filtering/matching servers 403 can easily search the metadata database 308 for matching content.

When the filtering/matching servers 403 find content that matches a user's wishlist, the servers request that the content be downloaded to the user's multimedia device from the content delivery servers 309. The content delivery servers 309 have download queues 404 for each multimedia device for which the filtering/matching servers 403 have requested content. The content delivery servers 403 place content along with customized associated metadata (discussed below) that the filtering/matching servers 403 have requested for a multimedia device into a download queue for the multimedia device 404. The filtering/matching servers 403 ensure that a user does not receive repeats of content that the user has already viewed or heard. The filtering/matching servers track the content currently contained in the content delivery servers 309 that each multimedia device has received. In an embodiment, older content that the multimedia devices have received are not tracked after the content have expired and are no longer in the content delivery servers 309.

The multimedia device 407 periodically synchronizes with the service 104. The multimedia device 407 sends a request for any content that the service 104 has for the multimedia device as well as other information such as electronic program guide information, software downloads, etc. The content delivery servers 309 check if to see if there is a queue for the multimedia device 407. If ad(s) and/or content are in the queue 404, then the content delivery servers 309 download the contents of the queue 404 to the multimedia device 407.

In an alternative embodiment, the service 104 notifies the multimedia device 407 that the multimedia device should make its request for synchronization because the service has data for the multimedia device. The service 104 can use any communications protocol, e.g., XMPP, SSL, etc., to issue the notification command to the multimedia device 407. The multimedia device 407 then makes its synchronization request to the service 104 using its Internet or network connection. The service 104 and multimedia device 407 can communicate via standard Internet protocols in order to effectuate data transfer. Examples of secure data transfer between a service and multimedia device are described in U.S. Pat. No. 6,728,713 and U.S. patent application Ser. No. 10/741,596, both of which are owned by the Applicants and are hereby incorporated by reference. For example, the service 104 and multimedia device 407 can encrypt data transfers using private/public key pairs, digital certificates, etc., in order to create a secure data transfer.

An embodiment charges the advertiser or content provider a fee when the advertiser's or content provider's content are downloaded to a multimedia device 405. The fee may cover download bandwidth costs as well as overhead costs. The fee may also include a profit schedule. The content delivery servers 309 notify the billing system 406 that content has been downloaded. The billing system correlates downloaded content with the appropriate advertiser or content provider using unique identifiers from the content. The billing system can generate invoices for the advertiser or content provider that details downloads to multimedia devices.

Figure 5:
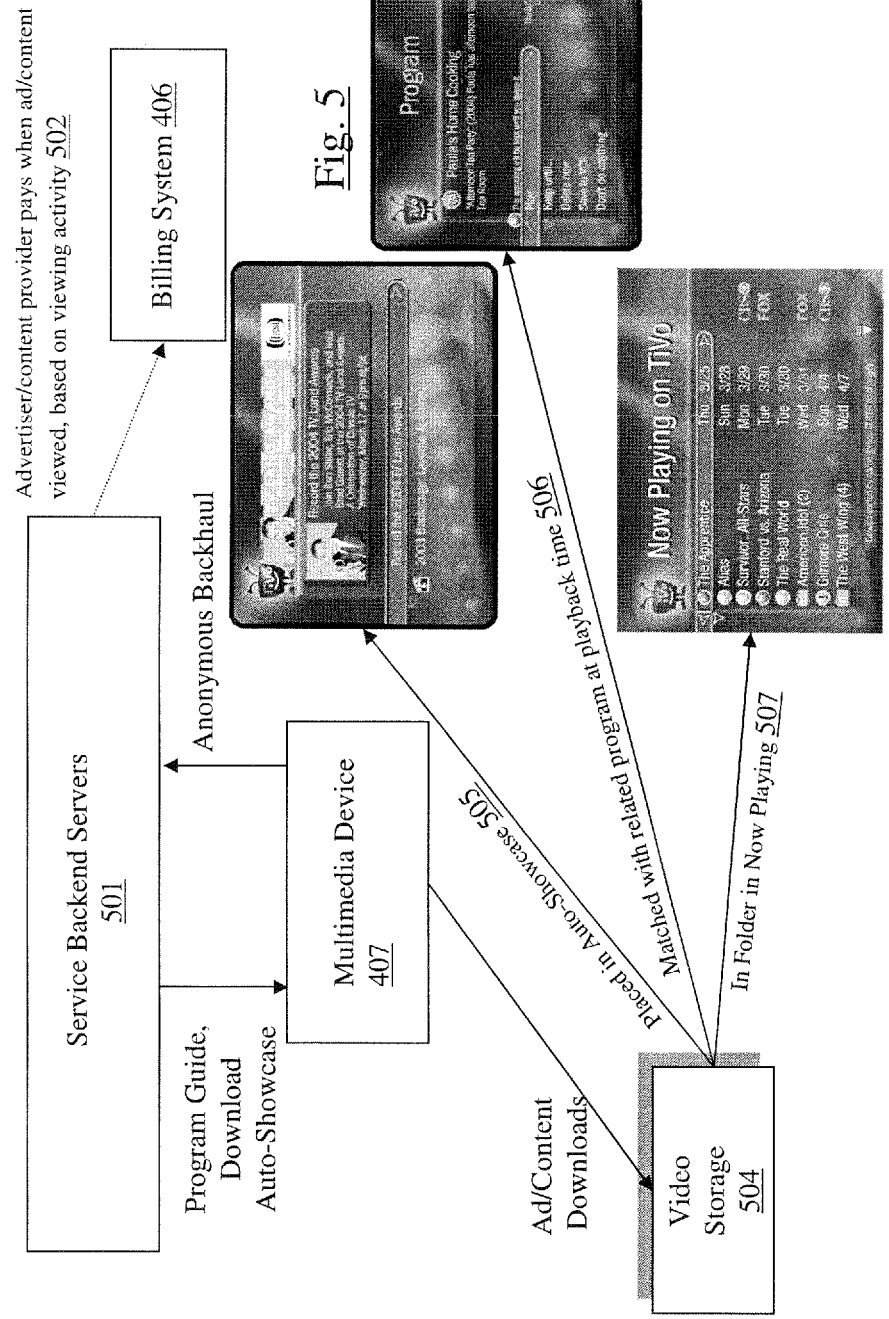
FIG. 5 is a block diagram that illustrates a multimedia device displaying advertisements and content and tracking user input according to an embodiment of the invention.
Figure 6:
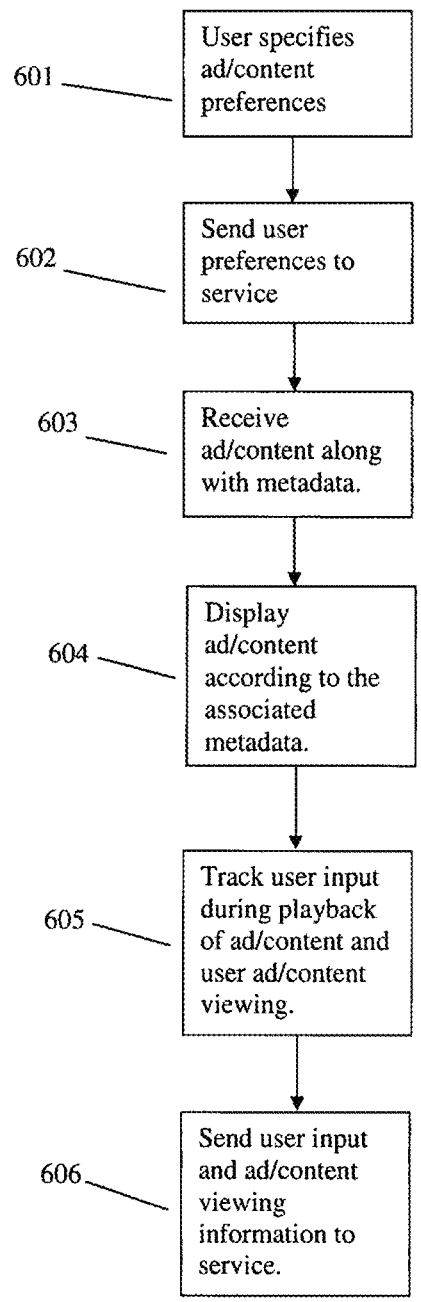
FIG. 6 is a flow chart that illustrates a multimedia device's operations according to the invention.

The operation of a multimedia device is shown in FIGS. 5 and 6. After the user specifies his interest preferences 601, the multimedia device 407 sends the user's preferences to the ad/content wishlist server(s) 602. The multimedia device 407 receives content downloads along with their associated metadata 603 from the content delivery servers 309 and stores the content in a storage device 504. The associated metadata may be a subset of what is stored in the metadata database 308. The associated metadata may instruct the multimedia device 407 as to when and how content is to be displayed and may also contain a title and possibly a synopsis of the content. The storage device can be a hard disk, RAM, NVRAM, solid state disk, or other static memory devices. The multimedia device 407 can also receive program guide information, downloaded content auto-showcase data (discussed below), software downloads, etc. from the service backend servers 501.

The multimedia device 407 can indicate to the user that content are available through several methods. An embodiment displays the available content using an auto-showcase. The auto-showcase data is used to highlight content from specific providers (e.g., Coke, Pepsi, Lexus, Honda, BMW, Mercedes, ABC, NBC, CBS, HBO, Showtime, etc.). NBC may want to advertise upcoming shows or sell items relating to popular shows, for example. The auto-showcase displays the brand names and their logos in a user interface. The user selects one of the brands and the user interface displays a list of the content stored on the storage device 504 for that brand. When the user highlights one of the content in the list, the user interface can display a graphical and textual synopsis of the highlighted content. The user selects the content and the multimedia device 407 plays the content for the user. As noted above, the content may be audio, video, text, or other visual or audio format.

The multimedia device 407 can also display the content with a related program when the user views the related program 506. The multimedia device 407 receives metadata along with the content that allows the service to tell the multimedia device 407 when content should be shown 604. The metadata may specify what program or type of program during which the content should be played. The metadata may specify that the content is to be played before or after a program. It may specify that the content be displayed in a user interface screen that appears when the user selects a program from a list of programs recorded on the storage device 504. This allows the user to view the content while viewing a synopsis of the program.

The content title or description may appear on the program synopsis user interface screen as a menu item that the user can select. Such a user interface method is also described in U.S. patent application Ser. Nos. 11/474,039 and 11/492,281, both owned by the Applicants and incorporated herein by reference. When the user selects the content from the menu, the content is played to the user. The play back can occur in a full screen mode or can appear within a window on the user interface screen for the program synopsis.

The multimedia device 407 can display the title or description of the content in a recorded program user interface screen 507. The recorded program user interface screen displays a list of programs that are stored on the storage device 504. The titles or descriptions of the content are listed along with the stored programs. The user can select a specific program, ad, or content to playback. If there are two or more content that fall under the same category, then a folder may be shown that has the title of the category (e.g., automobiles, travel, finance, etc.) listed next to the folder icon. The user selects the folder and the content in the folder are listed on the user interface screen. The user can then select content from the list to be played back.

The multimedia device 407 is in a unique position to monitor the user's actions while the user is viewing an content. The multimedia device 407 displays the content to the user. While the user is viewing the content, the user may fast forward, rewind, frame step, or pause during the content. The user may also view the content more than once. The multimedia device 407 stores information regarding the user's actions while viewing the content 605. The information may also include information such as when the user viewed the content, if the user viewed the entire content or partially viewed the content, what parts of the content were viewed repeatedly, etc.

As described above, the multimedia device 407 periodically contacts the service backend servers 501 and sends statistical information regarding the user's actions along with the identification of content associated with the actions to the service backend servers 606. The user information is anonymous and is not traceable back to the multimedia device, thereby ensuring the user's privacy. Alternatively, the user may want his user information identified with him. This may occur when the user is being paid for his data or he opts into releasing his information, for example.

The service backend servers 501 send the statistical information and content associated information to the billing system 406. The billing system 406 evaluates the statistical information for viewed content received from multimedia devices and charges a viewing fee to advertisers and content providers that had their content viewed by the user 502.

The service 104 is able to charge a fee to advertisers and content providers for the download of the content to the multimedia devices and also when content is viewed by a user.

The backend servers 501 gather the statistical information from multimedia devices and can create reports and charts for an advertiser or content provider. These reports and charts indicate to an advertiser or content provider what actions users performed while viewing or listening to their content. The report and charts can detail what portions of the content were viewed the most (e.g., using fast forward, rewind, and pause user action data) or what portions where skipped over (e.g., using fast forward user action data). The reports and charts can also indicate the popularity of all delivered content for a specific advertiser or content provider (e.g., based on the number of users viewing the content, or the number of downloads to multimedia devices). The advertiser or content provider can use these reports and charts to judge the effectiveness of their content.

The service 104 can create reports and charts that show which advertisers or content providers have the most popular or least popular content. This allows the service 104 to publish popularity ratings for users to view. The users may download and view the most popular content based on the ratings, thereby generating more viewings for an advertiser or content provider as well as generating more download and viewing revenue for the service 104.

Content can be tagged with information as described in U.S. patent application Ser. No. 09/665,921 owned by the Applicants and incorporated herein by reference, enabling various promotional features, such as scheduling future recordings, product purchasing, visiting a Web page, viewing further content, and so forth. The multimedia scans for tags and interprets tags and their data. The tags instruct the multimedia device 407 to display certain prompts or to schedule a recording of a certain program, etc., and also actions to take is a user inputs a command. The user can interact with the multimedia device 407 using a remote control.

For example, if a tag in content being viewed tells the multimedia device 407 to display an icon that indicates to the user that he can view a list of video tours based on the item highlighted in the content. If the user confirms that he wants to view the list, the tag(s) give the multimedia device 407 enough information to format and display the list to the user. The tag(s) also give the multimedia device 407 enough information to perform an action if the user selects an item in the list, e.g., displaying a streaming video from a particular Web server or perform a product purchase transaction. The service 104 can charge an advertiser or content provider a fee based on the number of times users view additional content, visit Web pages, purchase products, etc.

3.0 Implementation Mechanisms—Hardware Overview

Figure 7:
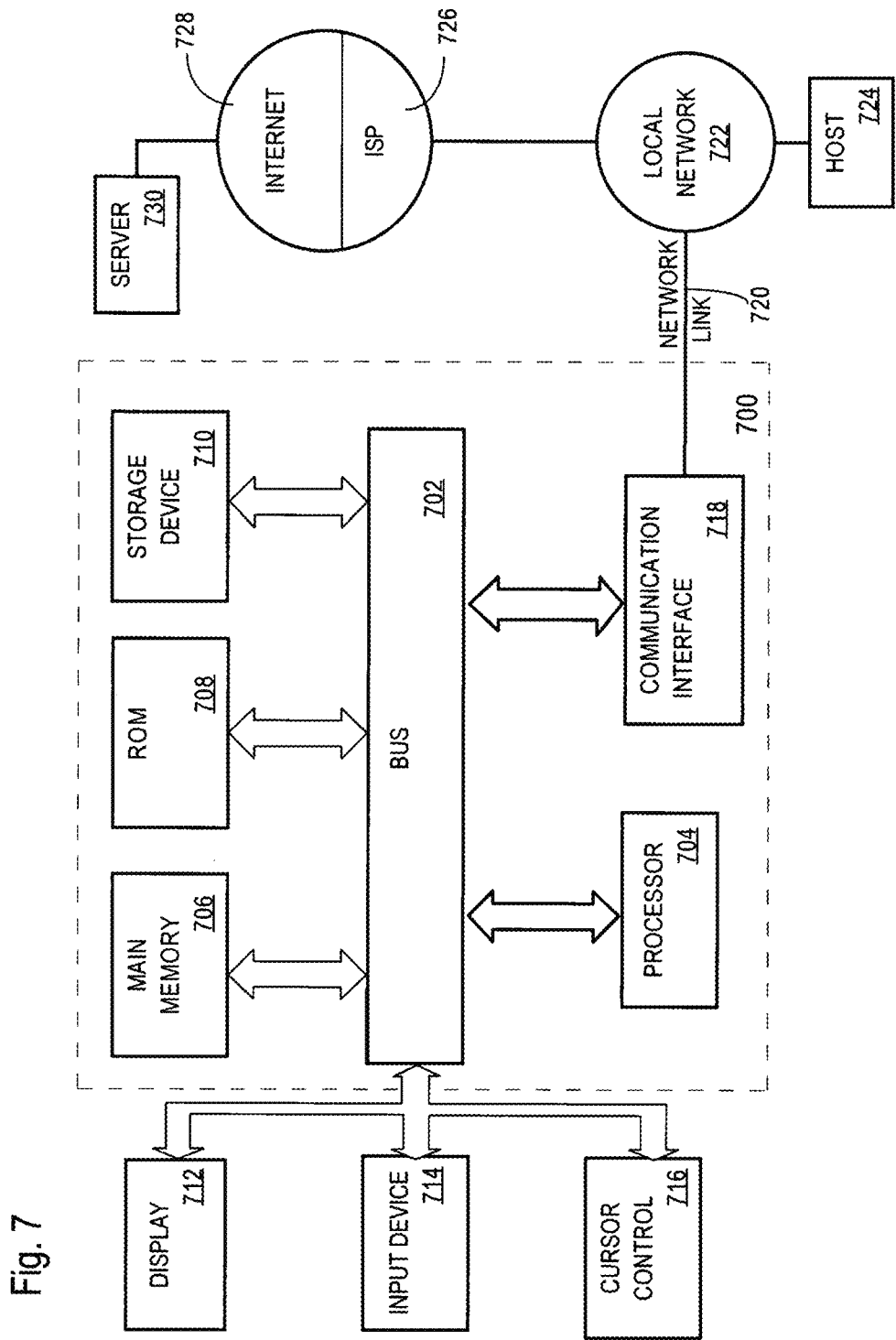
FIG. 7 is a block diagram that illustrates a computer system upon which an embodiment may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory ("RAM") or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory ("ROM") 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube ("CRT"), for displaying information to a computer user. An input device 714, including alphanumeric and other keys, is coupled to bus 702 for communicating information and command selections to processor 704. Another type of user input device is cursor control 716, such as a mouse, trackball, stylus, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for electronic commerce and brokering. According to one embodiment of the invention, an electronic commerce and brokering system is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector can receive the data carried in the infrared signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network ("ISDN") card or a modem to provide a data communication connection to a corresponding type of telephone line. As another example, communication interface 718 may be a local area network ("LAN") card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider ("ISP") 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for controlling document access using centrally managed rules as described herein.

The received code may be executed by processor 704 as it is received, and/or stored in storage device 710, or other non-volatile storage for later execution. In this manner, computer system 700 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for distributing advertisements and/or content to multimedia devices, comprising:
  receiving, at a server, content and associated metadata from advertisers and/or content providers, the received content including at least one of: video advertisements or content, audio advertisements or content, text advertisements or content, graphical advertisements or content, or multimedia advertisements or content, the associated metadata including at least one of: content title, content synopsis, information specifying what program or type of program the content should be played during, information specifying that the content is to be played before or after a program, or information specifying that the content be displayed in a specific user interface screen;
  receiving, at the server, a user's content viewing preferences;
  prior to the server receiving a synchronization request from a multimedia device that causes content items, in a content queue at the server specifically for the multimedia device, to be transferred from the server to the multimedia device, the server performing:
    matching, at the server, the user's content viewing preferences with appropriate received content using the received associated metadata;
    enqueuing, at the server, a plurality of content items as matched content and content information about the plurality of content items in the content queue at the server specifically for the multimedia device, the same content queue being used by the server to send queued content items to the multimedia device at a plurality of different times in response to a plurality of different synchronization requests from the multimedia device;
  in response to the server receiving the synchronization request from the multimedia device, sending, by the server, the matched content and content information in the content queue to the multimedia device; and receiving user input commands and associated content identification from the multimedia device that detail user input commands input by the user while viewing a matched sent content.

2. A method as recited in claim 1, further comprising:
ensuring that a user does not receive repeats of content that the user has already viewed or heard.

3. A method as recited in claim 1,
wherein the sending step sends any content and content information to the multimedia device if content and content information exist in the queue specifically for the multimedia device.

4. A method as recited in claim 1, further comprising:
generating a report based on user input commands and associated content identification received from a plurality of multimedia devices for any of: indicating popularity of content for a specific advertiser or content provider, indicating what actions users performed during display of certain content for a specific advertiser or content provider, or indicating most popular content of all advertisers or content providers that have content available from a service.

5. An apparatus for distributing advertisements and/or content to multimedia devices, comprising:
a device for receiving, at a server, content and associated metadata from advertisers and/or content providers, the received content including at least one of: video advertisements or content, audio advertisements or content, text advertisements or content, graphical advertisements or content, or multimedia advertisements or content, the associated metadata including at least one of: content title, content synopsis, information specifying what program or type of program the content should be played during, information specifying that the content is to be played before or after a program, or information specifying that the content be displayed in a specific user interface screen;
a device for receiving, at the server, a user's content viewing preferences;
a device for performing, prior to the server receiving a synchronization request from a multimedia device that causes content items, in a content queue at the server specifically for the multimedia device, to be transferred from the server to the multimedia device, by the server:
matching, at the server, the user's content viewing preferences with appropriate received content using the received associated metadata;
enqueuing, at the server, a plurality of content items as matched content and content information about the plurality of content items in the content queue at the server specifically for the multimedia device, the same content queue being used by the server to send queued content items to the multimedia device at a plurality of different times in response to a plurality of different synchronization requests from the multimedia device;
a device for sending, by the server, matched content and content information in the content queue to the multimedia device in response to the server receiving the synchronization request from the multimedia device; and
a device for receiving user input commands and associated content identification from the multimedia device that detail user input commands input by the user while viewing a sent matched content.

6. An apparatus as recited in claim 5, further comprising:
a module for ensuring that a user does not receive repeats of content that the user has already viewed or heard.

7. An apparatus as recited in claim 5,
wherein the sending module sends any content and content information to the multimedia device if content and content information exist in the queue specifically for the multimedia device.

8. An apparatus as recited in claim 5, further comprising:
a module for generating a report based on user input commands and associated content identification received from a plurality of multimedia devices for any of:
indicating popularity of content for a specific advertiser or content provider, indicating what actions users performed during display of certain content for a specific advertiser or content provider, or indicating most popular content of all advertisers or content providers that have content available from a service.

9. A non-transitory computer-readable medium carrying one or more sequences of instructions for distributing advertisements and/or content to multimedia devices, which instructions, when executed by one or more processors, cause the one or more processors to carry out the steps of:
receiving, at a server, content and associated metadata from advertisers and/or content providers, the received content including at least one of: video advertisements or content, audio advertisements or content, text advertisements or content, graphical advertisements or content, or multimedia advertisements or content, the associated metadata including at least one of: content title, content synopsis, information specifying what program or type of program the content should be played during, information specifying that the content is to be played before or after a program, or information specifying that the content be displayed in a specific user interface screen;
receiving, at the server, a user's content viewing preferences;
prior to the server receiving a synchronization request from a multimedia device that causes content items, in a content queue at the server specifically for the multimedia device, to be transferred from the server to the multimedia device, the server performing:
matching, at the server, the user's content viewing preferences with appropriate received content using the received associated metadata;
enqueuing, at the server, a plurality of content items as matched content and content information about the plurality of content items in the content queue at the server specifically for the multimedia device, the same content queue being used by the server to send queued content items to the multimedia device at a plurality of different times in response to a plurality of different synchronization requests from the multimedia device;
in response to the server receiving the synchronization request from the multimedia device, sending, by the server, the matched content and content information in the content queue to the multimedia device; and
receiving user input commands and associated content identification from the multimedia device that detail user input commands input by the user while viewing a matched sent content.

10. A non-transitory computer-readable medium as recited in claim 9, further comprising:
ensuring that a user does not receive repeats of content that the user has already viewed or heard.

11. A non-transitory computer-readable medium as recited in claim 9,
wherein the sending step sends any content and content information to the multimedia device if content and content information exist in the queue specifically for the multimedia device.

12. A non-transitory computer-readable medium as recited in claim 9, further comprising:
generating a report based on user input commands and associated content identification received from a plurality of multimedia devices for any of: indicating popularity of content for a specific advertiser or content provider, indicating what actions users performed during display of certain content for a specific advertiser or content provider, or indicating most popular content of all advertisers or content providers that have content available from a service.

\* \* \* \* \*